(12) United States Patent
Koyama et al.

(10) Patent No.: US 10,224,783 B2
(45) Date of Patent: Mar. 5, 2019

(54) ENGINE-DRIVEN WORKING MACHINE

(71) Applicant: HONDA MOTOR CO., LTD., Tokyo (JP)

(72) Inventors: Hiroshi Koyama, Wako (JP); Masashi Kai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 125 days.

(21) Appl. No.: 15/454,489

(22) Filed: Mar. 9, 2017

(65) Prior Publication Data

US 2017/0271942 A1  Sep. 21, 2017

(30) Foreign Application Priority Data

Mar. 16, 2016 (JP) .................. 2016-051821

(51) Int. Cl.
| | |
|---|---|
| F01N 13/00 | (2010.01) |
| H02K 5/24 | (2006.01) |
| F01N 1/24 | (2006.01) |
| F01N 13/14 | (2010.01) |
| H02K 7/18 | (2006.01) |
| F01P 1/06 | (2006.01) |

(52) U.S. Cl.
CPC .............. *H02K 5/24* (2013.01); *F01N 1/24* (2013.01); *F01N 13/002* (2013.01); *F01N 13/14* (2013.01); *F01P 1/06* (2013.01); *H02K 7/1815* (2013.01); *F01N 2260/022* (2013.01); *F01N 2590/06* (2013.01)

(58) Field of Classification Search
CPC .................................... F01N 13/002
USPC ........................ 181/204, 283, 225
See application file for complete search history.

(56) References Cited

U.S. PATENT DOCUMENTS

| | | | | |
|---|---|---|---|---|
| 4,608,946 A | * | 9/1986 | Tanaka ................. | F01N 13/002 123/2 |
| 4,677,940 A | * | 7/1987 | Bracht .................... | F01P 1/00 123/2 |
| 4,741,411 A | * | 5/1988 | Stricker .................. | F01N 3/05 181/240 |
| 5,228,530 A | * | 7/1993 | Tsuchihashi .......... | B60K 11/04 180/68.4 |
| 5,284,115 A | * | 2/1994 | Imanishi ................ | B60K 11/00 123/198 E |
| 5,689,953 A | * | 11/1997 | Yamashita ............ | B60K 11/02 123/41.49 |

(Continued)

FOREIGN PATENT DOCUMENTS

JP  S59-181232  12/1984

OTHER PUBLICATIONS

European Search Report dated Jul. 11, 2017, 6 pages.

*Primary Examiner* — Jeremy A Luks
(74) *Attorney, Agent, or Firm* — Rankin, Hill & Clark LLP

(57) ABSTRACT

An engine-driven working machine capable of favorably reducing exhaust sound (that is, noise) is provided. An engine-driven working machine 10 is a generator in which an engine 15 and a muffler 67 are housed in an inside 13 of an outer case 12. The generator 10 includes a tail pipe 68 that is provided at a lower portion 67a of the muffler 67, a discharge port 37 that is disposed above the tail pipe 68, and a baffle plate 84 that is disposed to face the discharge port 37. The discharge port 37 is formed in the outer case 12. Further, cooling air that is sent from a cooling fan 17 is guided to below the muffler 67 with the baffle plate 84.

4 Claims, 13 Drawing Sheets

(56) References Cited

U.S. PATENT DOCUMENTS

| | | | | |
|---|---|---|---|---|
| 6,095,099 | A * | 8/2000 | Morohoshi | F02B 77/13 |
| | | | | 123/2 |
| 6,427,798 | B1 * | 8/2002 | Imashige | E02F 3/325 |
| | | | | 123/41.31 |
| 7,398,747 | B2 * | 7/2008 | Onodera | F01P 5/06 |
| | | | | 123/198 E |
| 8,210,133 | B2 * | 7/2012 | Hirose | F01P 5/06 |
| | | | | 123/198 E |
| 2005/0061265 | A1 * | 3/2005 | Yuasa | F01P 1/02 |
| | | | | 123/41.7 |
| 2008/0048509 | A1 * | 2/2008 | Murakami | F01P 5/06 |
| | | | | 310/51 |
| 2017/0271953 | A1 * | 9/2017 | Koyama | F01P 1/06 |

* cited by examiner

ENGINE-DRIVEN WORKING MACHINE

INCORPORATION BY REFERENCE

The present application claims priority under 35 U.S.C. § 119 to Japanese Patent Application No. 2016-051821 filed on Mar. 16, 2016. The content of the application is incorporated herein by reference in its entirety.

BACKGROUND OF THE INVENTION

Field of the Invention

The present invention relates to an engine-driven working machine having an engine and a muffler housed in an inside of an outer case.

Description of the Related Art

As an engine-driven working machine, there is known a generator in which a muffler is housed in an inside of an outer case, a tail pipe is extended to a silencing chamber from the muffler, and an exhaust port of the tail pipe is opened to be laterally oriented to face a discharge port. Further, a sound absorbing member is provided in the silencing chamber. According to the engine-driven working machine, exhaust gas is guided to the silencing chamber from the exhaust port of the tail pipe, and the exhaust gas which is guided is discharged to an outside of the outer case from the exhaust port via the silencing chamber (refer to Japanese Utility Model Laid-Open No. 59-181232, for example).

According to the engine-driven working machine of Japanese Utility Model Laid-Open No. 59-181232, it is possible to insulate exhaust sound of the exhaust gas in the silencing chamber to some extent, by guiding the exhaust gas to the silencing chamber from the exhaust port of the tail pipe. Further, the sound absorbing member is provided in the silencing chamber, and therefore, it is possible to absorb the exhaust sound of the exhaust gas to some extent by the sound absorbing member.

However, in the engine-driven working machine of Japanese Utility Model Laid-Open No. 59-181232, the exhaust port of the tail pipe is opened to be laterally oriented to face the discharge port. Thereby, it is difficult to insulate the exhaust sound of the exhaust gas favorably in the silencing chamber. Consequently, a contrivance to reduce the exhaust sound (that is, noise) is required, and there is left a room for improvement from this point of view.

SUMMARY OF THE INVENTION

The present invention addresses a problem to provide an engine-driven working machine that is capable of favorably reducing exhaust sound (that is, noise).

A first aspect of the present invention provides an engine-driven working machine in which an engine and a muffler are housed in an inside of an outer case, including a tail pipe that is provided at a lower portion of the muffler, a discharge port that is disposed above the tail pipe, and is formed in the outer case, and a baffle plate that is disposed to face the discharge port, and guides cooling air that is sent from a cooling fan, to below the muffler.

As above, the tail pipe is provided at the lower portion of the muffler, and the discharge port is disposed above the tail pipe. Consequently, the exhaust port of the tail pipe can be separated downward from the discharge port. Exhaust gas is discharged from the discharge port. Thereby, the exhaust gas can be discharged to a position that is separated from the discharge port, so that insulation of exhaust sound is enhanced, and the exhaust sound (that is, noise) can be favorably reduced.

Further, the baffle plate is disposed to face the discharge port, and cooling air is guided to below the muffler with the baffle plate. Thereby, the cooling air can be guided to the tail pipe and surroundings of the tail pipe. Consequently, the members around the tail pipe can be prevented from being deteriorated by exhaust heat.

In a second aspect of the present invention, the engine-driven working machine preferably further includes a protector that covers the muffler and the tail pipe, and a sound absorbing member that is provided on an inner surface of the protector.

As above, the muffler and the tail pipe are covered with the protector, and the sound absorbing member is provided on the inner surface of the protector. Thereby, the exhaust sound that is discharged from the discharge port can be absorbed by the sound absorbing member, and the exhaust sound can be reduced more favorably.

Further, by guiding the cooling air to the tail pipe and the surroundings of the tail pipe with the baffle plate, the cooling air can be guided to the protector and the sound absorbing member. Thereby, the protector and the sound absorbing member can be prevented from being deteriorated by the exhaust heat.

In a third aspect of the present invention, in the tail pipe, an exhaust port of the tail pipe is preferably opened to intersect an opening direction of the discharge port.

As above, the exhaust port of the tail pipe is opened to intersect the opening direction of the discharge port. Thereby, the orientation of the discharge port can be shifted from the traveling direction of the exhaust sound. Thereby, insulation of the exhaust sound is enhanced, and the exhaust sound can be reduced more favorably.

According to the present invention, the tail pipe is provided at the lower portion of the muffler, and the discharge port is disposed above the tail pipe. Thereby, exhaust sound (that is, noise) can be reduced favorably.

DETAILED DESCRIPTION OF THE PREFERRED EMBODIMENTS

Figure 1:
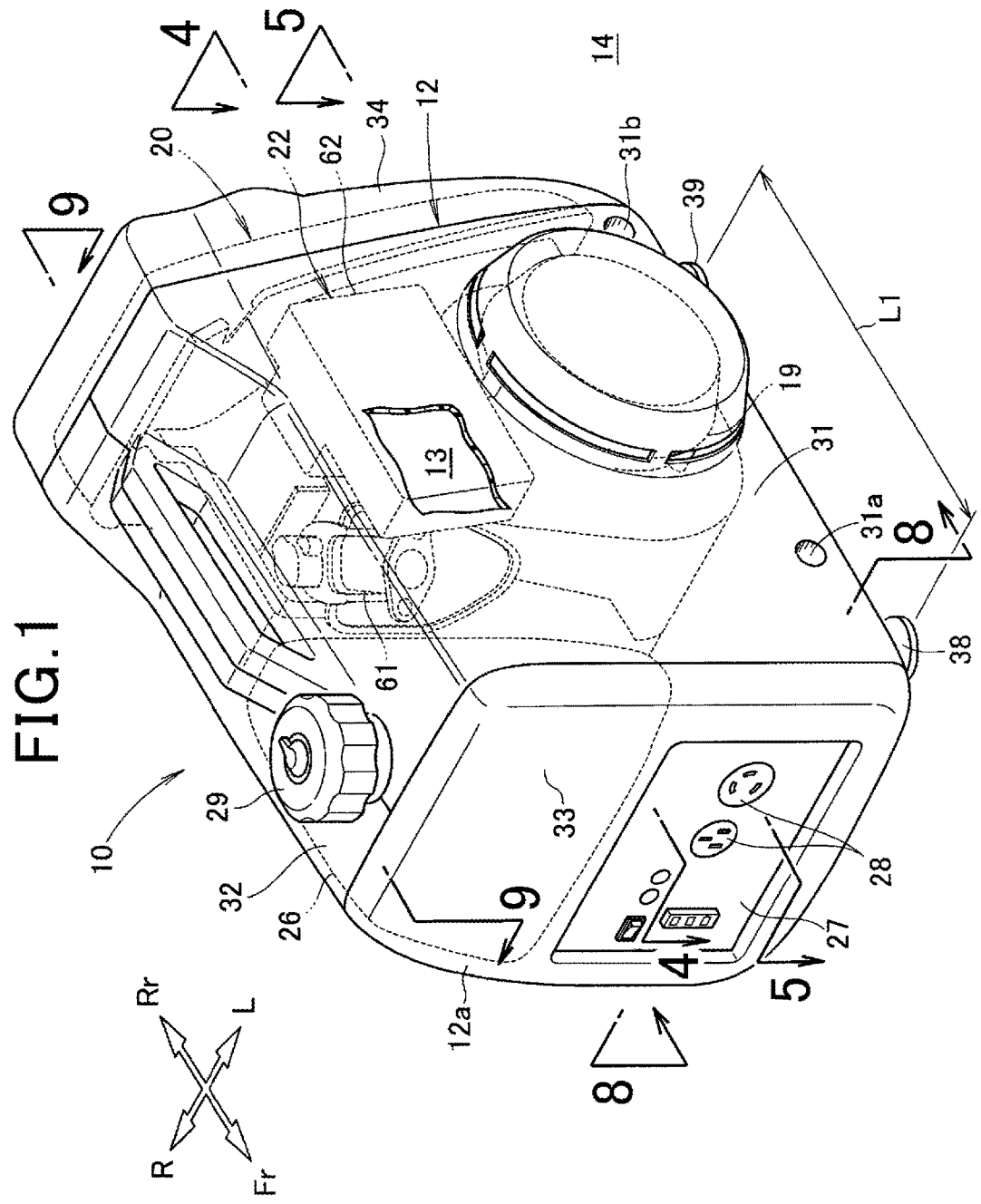
FIG. 1 is a perspective view of an engine-driven working machine according to the present invention.

A best mode for carrying out the present invention will be described hereinafter on the basis of the accompanying drawings.

Note that "a front (Fr)", "a rear (Rr)", "a left (L)" and "a right (R)" shown in the drawings are set based on an operation panel 27 side of an engine-driven working machine 10 as the front (Fr).

Here, an example of applying the engine-driven working machine 10 according to the present invention to "a generator 10" in an embodiment will be described, but it is also possible to apply the engine-driven working machine 10 to other working machines such as a mowing machine, a snowplow, and a tiller.

Embodiment

The engine-driven working machine (more specifically, the generator) 10 according to the embodiment will be described.

Figure 2:
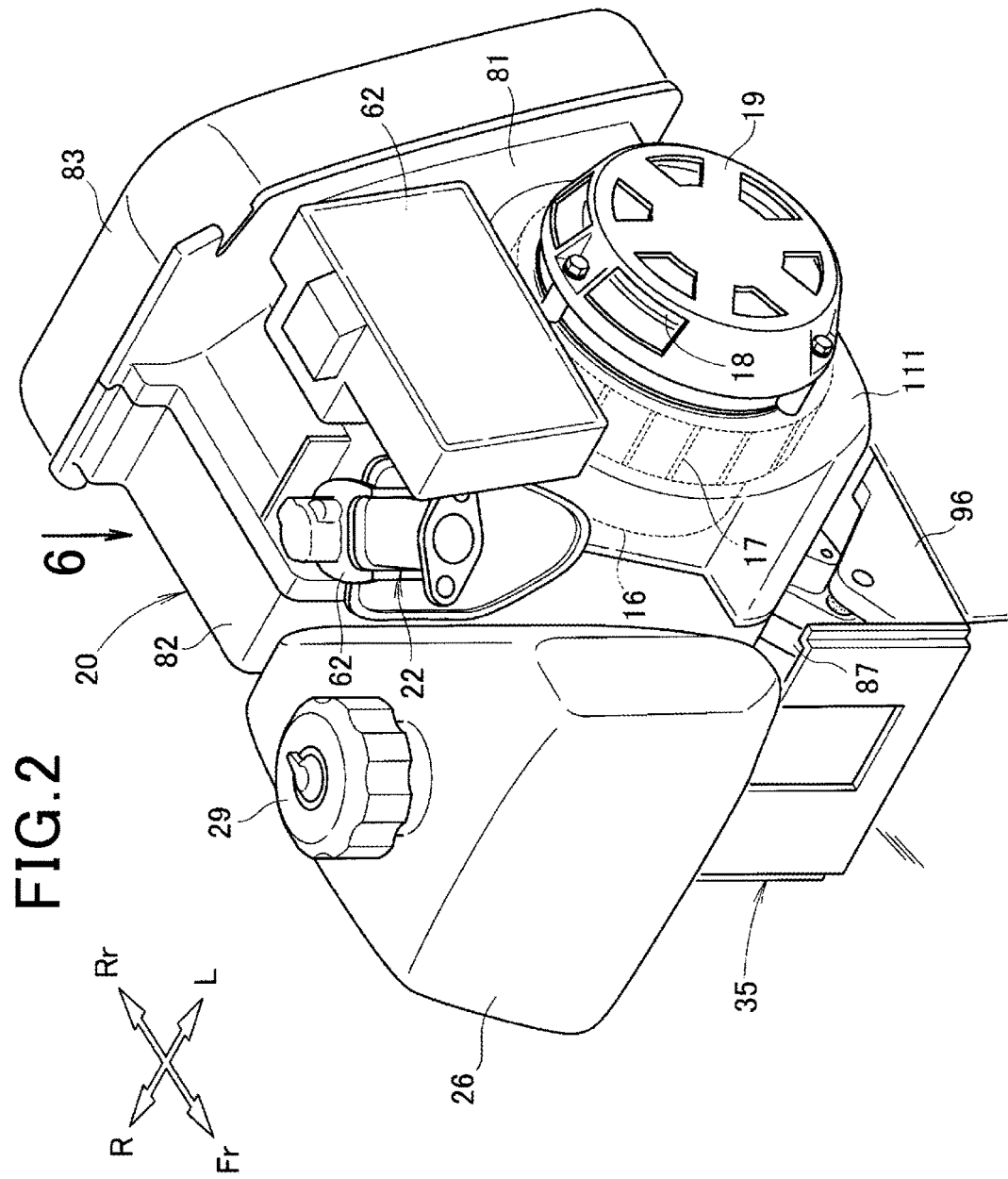
FIG. 2 is a perspective view illustrating a fuel tank and a cover unit in FIG. 1.

As illustrated in FIGS. 1 and 2, the generator 10 includes an outer case 12 that forms an outer frame of the generator 10, an engine 15 (refer to FIG. 3) that is housed in an inside 13 of the outer case 12, a power generating unit (working unit) 16 that is provided at a left side of the engine 15, a cooling fan 17 that is provided at a left side of the power generating unit 16, a recoil starter 18 that is provided at a left side of the cooling fan 17, and a cover unit 20 that covers the engine 15.

The recoil starter 18 is covered with a recoil cover 19.

Further, the generator 10 includes an intake system (an intake system component) 22 that communicates with the engine 15, an exhaust system (an exhaust system component) 24 (refer to FIG. 4) that is connected to the engine 15, a fuel tank 26 that is disposed in front of the engine 15, and the operation panel 27 that is provided on a front wall 12a of the outer case 12.

According to the generator 10, the engine 15 (refer to FIG. 3) drives by manually rotating the recoil starter 18. A crankshaft 41 (refer to FIG. 5) rotates by the engine 15 driving. A rotor of the power generating unit 16 is connected to the crankshaft 41. Thereby, the rotor of the power generating unit 16 rotates by the crankshaft 41 rotating.

The rotor of the power generating unit 16 rotates, whereby an electromotive force is generated in the rotor and a stator, and power generation is performed in the power generating unit 16. A direct-current power that is generated in the power generating unit 16 is converted into an alternating-current power in an inverter, and is supplied to an outside from a connector 28 on the operation panel 27.

Further, the cooling fan 17 is connected to the rotor of the power generating unit 16. Thereby, the rotor of the power generating unit 16 rotates, whereby the cooling fan 17 rotates. The cooling fan 17 rotates, whereby outside air is sucked into the inside 13 from an outside 14 of the outer case 12, and the outside air which is sucked is sent to the intake system 22, the engine 15 and the exhaust system 24 as cooling air.

Figure 5:
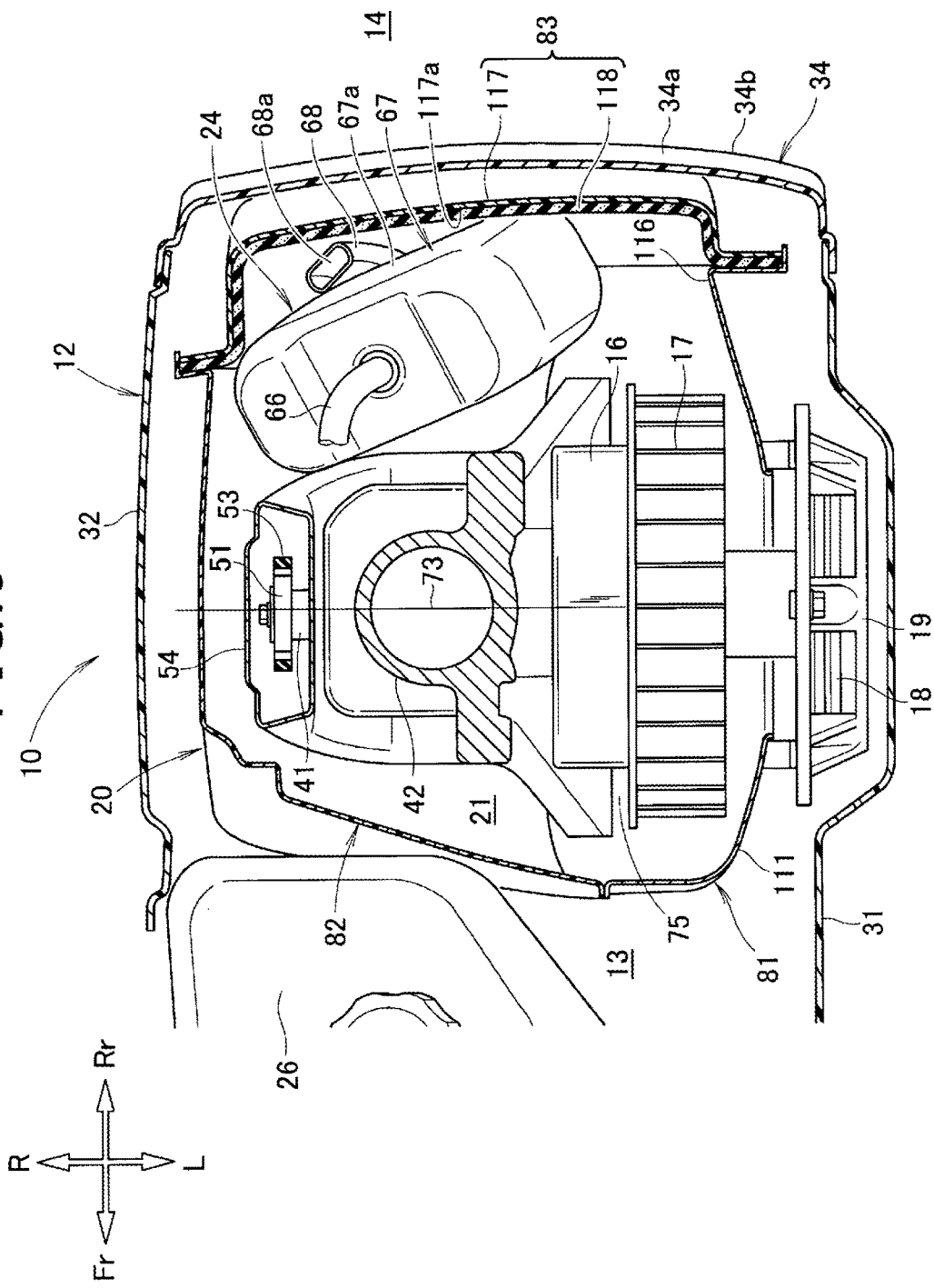
FIG. 5 is a sectional view taken along line 5-5 in FIG. 1.

Here, the generator 10 (that is, the engine 15) drives, and thereby vibration occurs around the crankshaft 41 (refer to FIG. 5). The vibration that occurs around the crankshaft 41 is suppressed by the generator 10.

Means for suppressing the vibration that occurs around the crankshaft 41 will be described in detail later.

The outer case 12 includes a left case 31 that forms a left half part of the outer case 12, a right case 32 that forms a right half part of the outer case 12, a front case 33 that is mounted to front end portions of the left case 31 and the right case 32, a rear case 34 that is mounted to rear end portions of the left case 31 and the right case 32, and an undercover 35 (refer to FIG. 3) that supports the respective cases 31 to 34.

The rear case 34 has a substantially rectangular discharge port 37 (refer to FIG. 9) in an upper portion of a rear wall 34a. That is, the upper portion of the rear wall 34a is opened to be in a substantially rectangular shape at the discharge port 37.

The outer case 12 is formed into a substantially rectangular shape in plan view so as to extend in a longitudinal direction (one direction) by the left case 31, the right case 32, the front case 33, the rear case 34 and the undercover 35. More specifically, the outer case 12 is formed into a substantially rectangular frame body shape that extends in the longitudinal direction.

The crankshaft 41 (refer to FIG. 5) is disposed to intersect (more specifically, be orthogonal to) the longitudinal direction of the outer case 12.

The engine 15 (refer to FIG. 3), the cover unit 20, and the fuel tank 26 are housed in the inside 13 of the outer case 12. In this state, a tank cap 29 of the fuel tank 26 is protruded (exposed) to above the outer case 12.

Further, the front wall 12a of the outer case 12 is formed by a front wall of the front case 33. The operation panel 27 is provided on the front wall 12a of the front case 33.

Front rubber support portions 38 (only the front rubber support portion 38 at a left side is illustrated) are attached to a left and right sides of a front end portion of the undercover 35. Further, rear rubber support portions 39 (only the rear rubber support portion 39 at a left side is illustrated) are attached to a left and right sides of a rear end portion of the undercover 35. The generator 10 is supported on a floor surface or the like with the front rubber support portions 38 at the left and right sides and the rear rubber support portions 39 at the left and right sides.

Here, the outer case 12 is formed into the substantially rectangular shape in plan view so as to extend in the longitudinal direction. Thereby, a space between the front end portion and the rear end portion of the undercover 35 is secured to be large.

Thereby, a space L1 between the front rubber support portion 38 that is attached to the front end portion of the undercover 35, and the rear rubber support portion 39 that is attached to the rear end portion of the undercover 35 is secured to be large.

Figure 3:
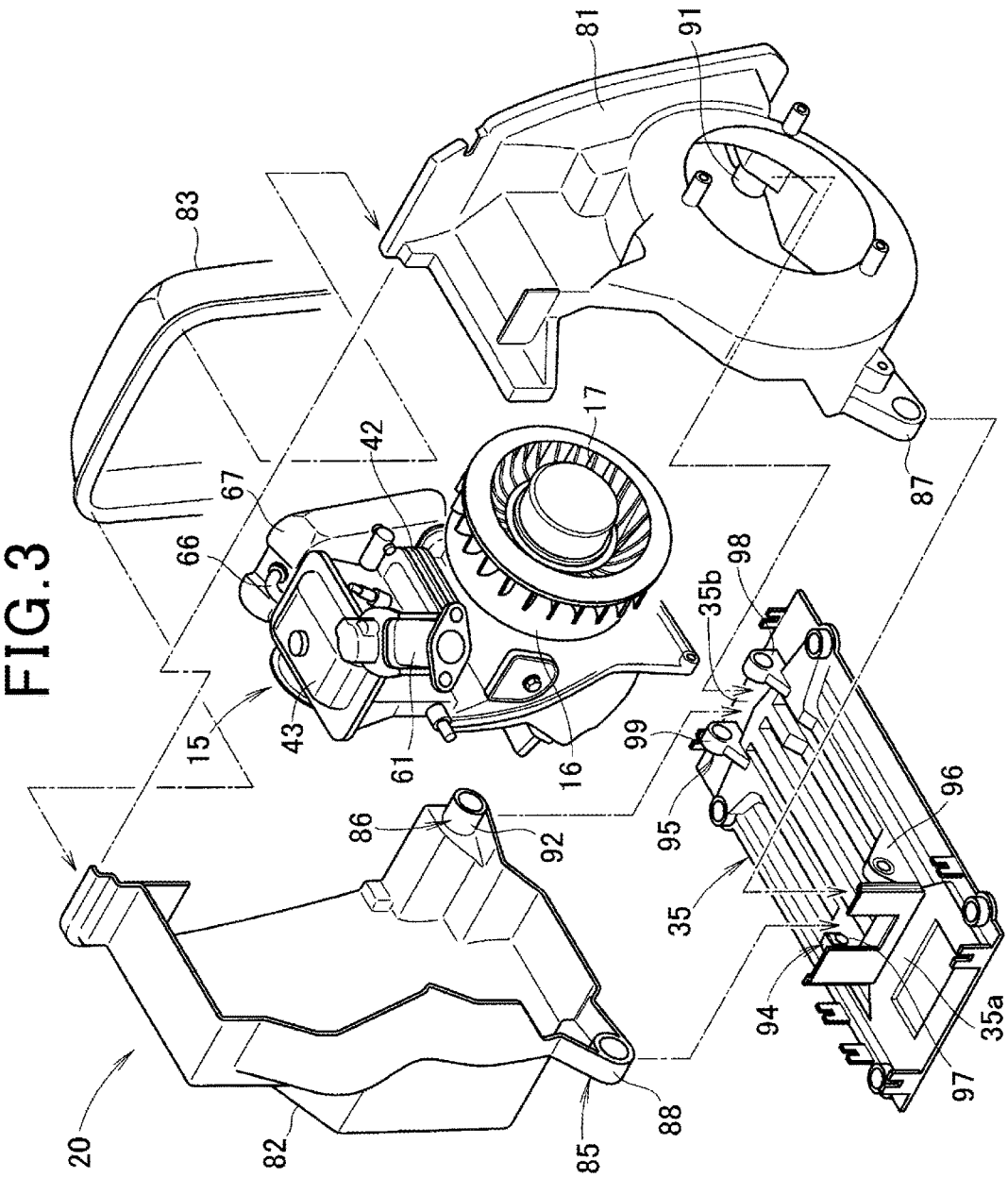
FIG. 3 is an exploded perspective view illustrating the cover unit in FIG. 2.
Figure 4:
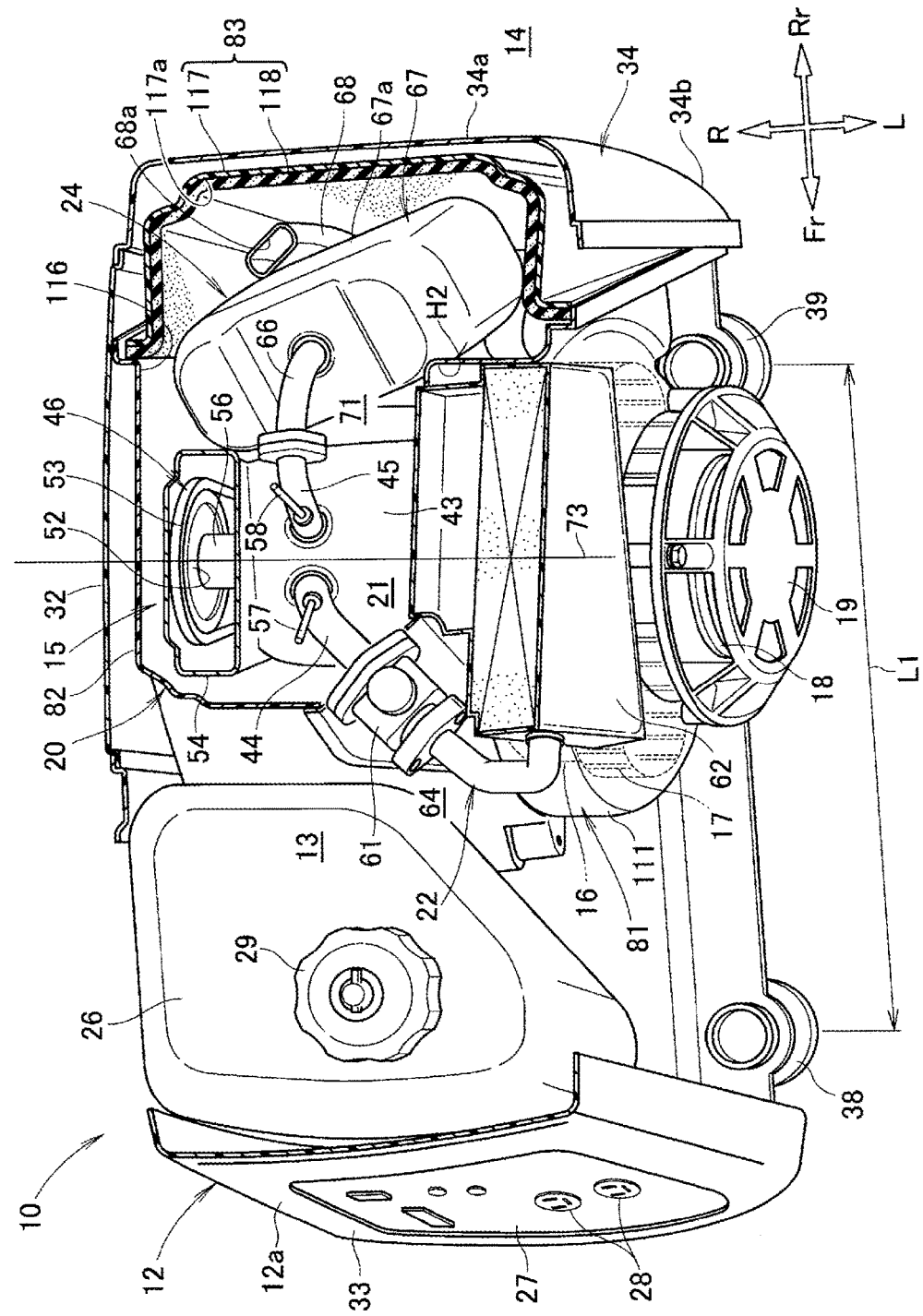
FIG. 4 is a sectional view taken along line 4-4 in FIG. 1.

As illustrated in FIGS. 3 and 4, the engine 15 is housed in the inside 21 of the cover unit 20. Further, the cover unit 20 is housed in the inside 13 of the outer case 12.

The engine 15 includes the crankshaft 41 (refer to FIG. 5) that extends in a lateral direction of the outer case 12, a cylinder 42 that is disposed above the crankshaft 41, a cylinder head 43 that is provided at an upper end portion of the cylinder 42, an intake port 44 and an exhaust port 45 that are provided at the cylinder head 43, and a valve mechanism 46 that is connected to the crankshaft 41.

As illustrated in FIG. 5, the crankshaft 41 is disposed to intersect (more specifically, be orthogonal to) the longitudinal direction of the outer case 12. In other words, the crankshaft 41 is disposed to extend in a lateral direction of the outer case 12.

That is, in a state where the engine 15 is housed in the inside 13 of the outer case 12, the engine 15 is disposed to be laterally oriented with respect to the outer case 12.

As illustrated in FIGS. 4 and 5, the valve mechanism 46 includes a drive timing pulley 51 that is provided coaxially with the crankshaft 41, a driven timing pulley 52 that is provided above the drive timing pulley 51, and a cam drive belt 53 that is laid across the drive timing pulley 51 and the driven timing pulley 52.

The drive timing pulley 51, the driven timing pulley 52 and the cam drive belt 53 are housed in an inside of a cam case 54. The cam case 54 is formed integrally with the cylinder 42.

Further, the valve mechanism 46 includes a camshaft 56 that supports the driven timing pulley 52, and an intake valve 57 and an exhaust valve 58 that drive by a cam of the camshaft 56. That is, the valve mechanism 46 is an overhead camshaft (OHC) type mechanism.

The intake valve 57 is disposed at one side (that is, one side in a direction intersecting the camshaft 56) of the camshaft 56. Further, the exhaust valve 58 is disposed at the other side (that is, the other side in the direction intersecting the camshaft 56) of the camshaft 56.

Further, the camshaft 56 of the valve mechanism 46 is disposed parallel with the crankshaft 41. Thereby, the intake valve 57 is disposed at a front side of the camshaft 56. Further, the exhaust valve 58 is disposed at a rear side of the camshaft 56.

Thereby, the intake port 44 is disposed at a front side of the cylinder head 43 (that is, the engine 15) in the longitudinal direction of the outer case 12. Further, the exhaust port 45 is disposed at a rear side of the cylinder head 43 (that is, the engine 15) in the longitudinal direction of the outer case 12.

A carburetor 61 of the intake system 22 is directly connected to the intake port 44. The carburetor 61 is disposed at a front side (that is, a front side of the engine 15) of the intake port 44, and at an outer side of the cover unit 20. More specifically, a fan cover 81 (described later) is included in the cover unit 20, and the carburetor 61 is disposed outside the fan cover 81.

Here, the outer case 12 is formed to be substantially rectangular in plan view to extend in the longitudinal direction. Thereby, a space 64 is easily secured in the front side of the intake port 44. Thereby, the space 64 in which the carburetor 61 is disposed can be secured relatively easily.

Further, the carburetor 61 is disposed at the intake port 44 side, and the carburetor 61 is directly connected to the intake port 44. Thereby, flow resistance of intake air that flows to the intake port 44 from the carburetor 61 is suppressed to be small.

Further, an air cleaner 62 of the intake system 22 is connected to the carburetor 61. The air cleaner 62 is disposed at a left side of the engine 15, above the cooling fan 17 and the power generating unit 16, and outside the cover unit 20.

More specifically, the air cleaner 62 is disposed outside the fan cover 81 that is included in the cover unit 20.

An exhaust passage (an exhaust manifold) 66 of the exhaust system 24 is connected to the exhaust port 45. The exhaust passage 66 is disposed at a rear side (that is, the rear side of the engine 15) of the exhaust port 45. Further, a muffler 67 of the exhaust system 24 is connected to the exhaust passage 66.

The muffler 67 is disposed at the rear side (that is, the rear side of the engine 15) of the exhaust port 45, and is housed in the inside 21 of the cover unit 20. A tail pipe 68 is provided at a lower portion 67*a* of the muffler 67. The tail pipe 68 communicates with the muffler 67.

The tail pipe 68 is raised upward from the lower portion 67*a* of the muffler 67, and an exhaust port 68*a* is opened upward at an upper end of the tail pipe 68. Exhaust gas is guided to the tail pipe 68 from the lower portion 67*a* of the muffler 67, and the guided exhaust gas passes through the tail pipe 68 and is discharged from the exhaust port 68*a*.

The tail pipe 68 is provided at the lower portion 67*a* of the muffler 67, whereby the exhaust port 68*a* of the tail pipe 68 is disposed at a lower portion 34*b* side of a rear wall 34*a* of the rear case 34. The discharge port 37 (refer to FIG. 9) is opened at an upper portion of the rear wall 34*a*.

Thereby, the discharge port 37 is disposed above the exhaust port 68*a* of the tail pipe 68.

Here, the outer case 12 is formed to be substantially rectangular in plan view to extend in the longitudinal direction. Thereby, a space 71 is easily secured at a rear side of the exhaust port. Thereby, the space 71 in which the exhaust passage 66 and the muffler 67 are disposed can be secured relatively easily.

Furthermore, the muffler 67 is disposed at the exhaust port 45 side. Thereby, the exhaust passage 66 that allows the muffler 67 to communicate with the exhaust port 45 does not have to be curved greatly, and can be simplified. Thereby, the flow resistance of the exhaust gas that flows in the exhaust passage 66 can be suppressed to be small.

In this way, the engine 15 is disposed to be laterally oriented in the inside 13 of the outer case 12, whereby the space 64 in which the carburetor 61 is disposed can be easily secured, and the space 71 in which the exhaust passage 66 and the muffler 67 are disposed can be easily secured. Thereby, the outer case 12 does not have to be upsized to secure the space 64 and the space 71.

Further, the engine 15 is disposed to be laterally oriented, whereby the flow resistances of intake air and exhaust gas are suppressed to be small, and the output power of the engine 15 is secured. Thereby, the engine 15 does not have to be upsized to secure the output power of the engine 15.

By suppressing upsizing of the outer case 12 and upsizing of the engine 15, the generator 10 can have a slim structure suitable to be carried.

Further, the power generating unit 16 is disposed at the left side of the engine 15 and at an extension line 73 side of the crankshaft 41. More specifically, the power generating unit 16 is provided on a same axis as the axis of the crankshaft 41.

Further, the cooling fan 17 is disposed at the left side of the power generating unit 16 and at the extension line 73 side of the crankshaft 41. More specifically, the cooling fan 17 is provided on a same axis as the axis of the crankshaft 41.

Here, an outlet port 75 from which a cooling air is blown from the cooling fan 17 is disposed to face the carburetor 61. That is, the outlet port 75 from which the cooling air is blown is disposed at a left side of the cylinder 42 and at a front side of the cylinder 42. In other words, the outlet port 75 from which the cooling air is blown is disposed at a left front side of the cylinder 42.

Thereby, the cooling air that is sent from the outlet port 75 of the cooling fan 17 is guided by the cover unit 20 to be led to the power generating unit 16 from the left front side of the cylinder 42. The cooling air that is guided to the power generating unit 16 is guided by the cover unit 20 and is guided to the front side of the cylinder 42 in a curved manner via the power generating unit 16. Thereby, the power generating unit 16 and the cylinder 42 can be cooled with the cooling air.

Further, the cooling air that is guided to the front side of the cylinder 42 is guided by the cover unit 20 and is guided to the muffler 67 via the cylinder 42. Thereby, the power generating unit 16, the cylinder 42 and the muffler 67 can be efficiently cooled with the cooling air that is sent from the outlet port 75 of the cooling fan 17.

Figure 6:
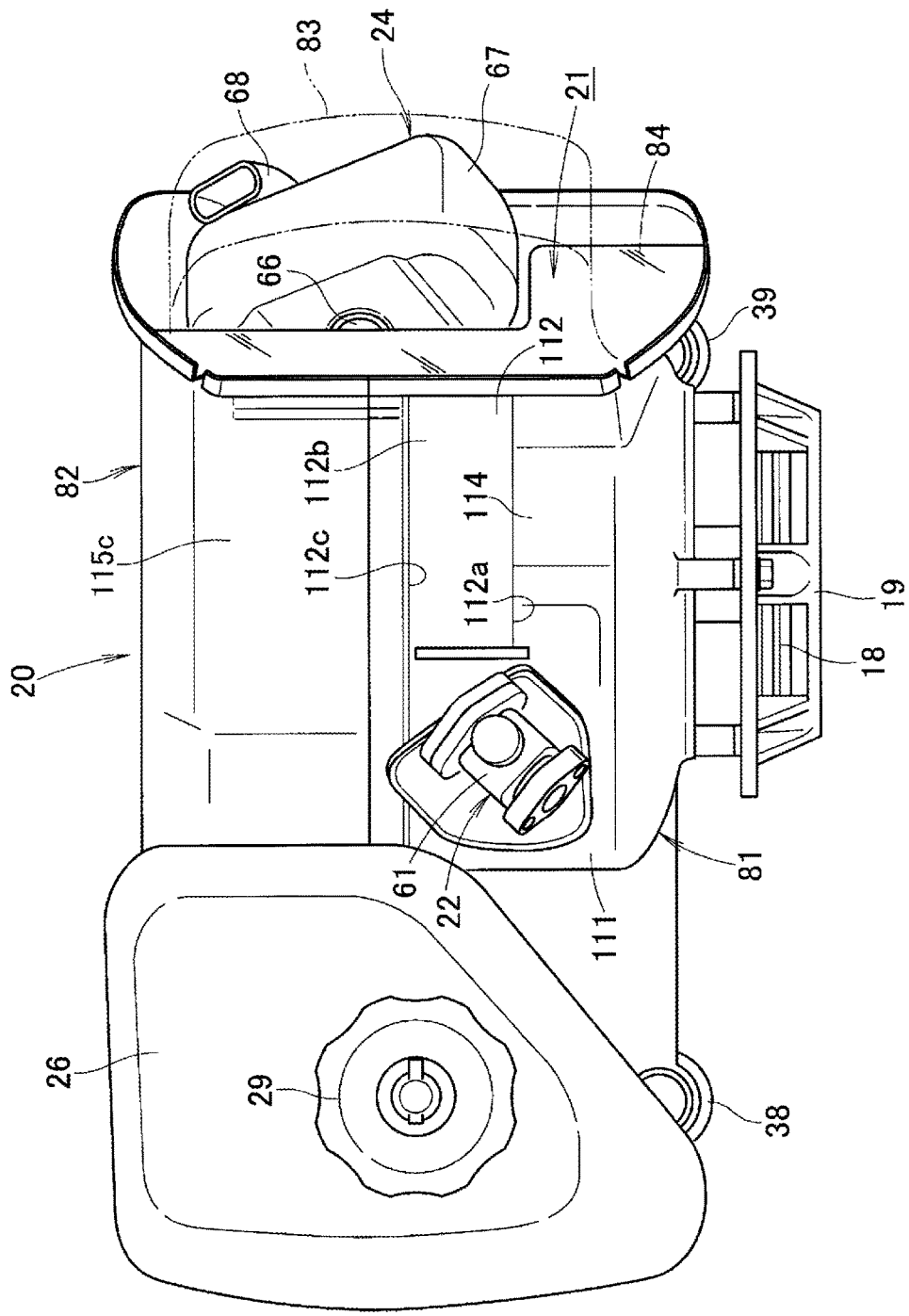
FIG. 6 is a view seen from an arrow 6 in FIG. 2.

As illustrated in FIGS. 3 and 6, the engine 15, the carburetor 61 and the muffler 67 are housed in the inside (refer to FIG. 4) of the cover unit 20.

The cover unit 20 includes the fan cover 81 that is provided at the left side of the engine 15, a shroud 82 that is provided at a right side of the engine 15, a muffler cover 83 that is provided at respective rear end portions of the fan cover 81 and the shroud 82, and a baffle plate 84 (also refer to FIG. 10) that is provided in front of the muffler cover 83.

The cooling fan 17 and the power generating unit 16 are covered with the fan cover 81. Further, the shroud 82 is provided at an opposite side (a right side) of the fan cover 81. The engine 15 is covered with the shroud 82 from the right side.

Further, the muffler cover 83 is provided at a rear end portion of the fan cover 81 and a rear end portion of the shroud 82. The muffler 67 is covered with the muffler cover 83. The baffle plate 84 is provided in the inside 21 of the cover unit 20 and in front of the muffler cover 83.

The fan cover 81, the shroud 82, the muffler cover 83 and the baffle plate 84 will be described in detail later.

In a state where the fan cover 81 and the shroud 82 are integrally connected, the fan cover 81 and the shroud 82 include first mounting means 85 and second mounting means 86.

The first mounting means 85 is formed at lower front portions of the fan cover 81 and the shroud 82 which are integrally connected. More specifically, the first mounting means 85 is configured by a first cover mounting portion 87 that is formed at a lower front portion of the fan cover 81, and a first shroud mounting portion 88 that is formed at a lower front portion of the shroud 82.

Further, the second mounting means 86 is formed at lower rear portions of the fan cover 81 and the shroud 82 which are integrally connected. More specifically, the second mounting means 86 is configured by a second cover mounting portion 91 that is formed at a lower rear portion of the fan cover 81, and a second shroud mounting portion 92 that is formed at a lower rear portion of the shroud 82.

The undercover 35 is disposed under the fan cover 81 and the shroud 82. The fan cover 81 and the shroud 82 are supported by the undercover 35.

The undercover 35 is formed to be substantially rectangular in plan view, and has a first support portion 94 that is provided at a front end portion 35a side (one end side in one direction of the outer case), and a second support portion 95 that is provided at a rear end portion 35b side (the other end side in the one direction of the outer case).

The first support portion 94 includes a first left support portion 96 that is provided at a front left end portion side of the undercover 35, and a first right support portion 97 that is provided at a front right end portion side of the undercover 35.

The second support portion 95 includes a second left support portion 98 that is provided at a rear left end portion side of the undercover 35, and a second right support portion 99 that is provided at a rear right end portion side of the undercover 35.

Figure 7:
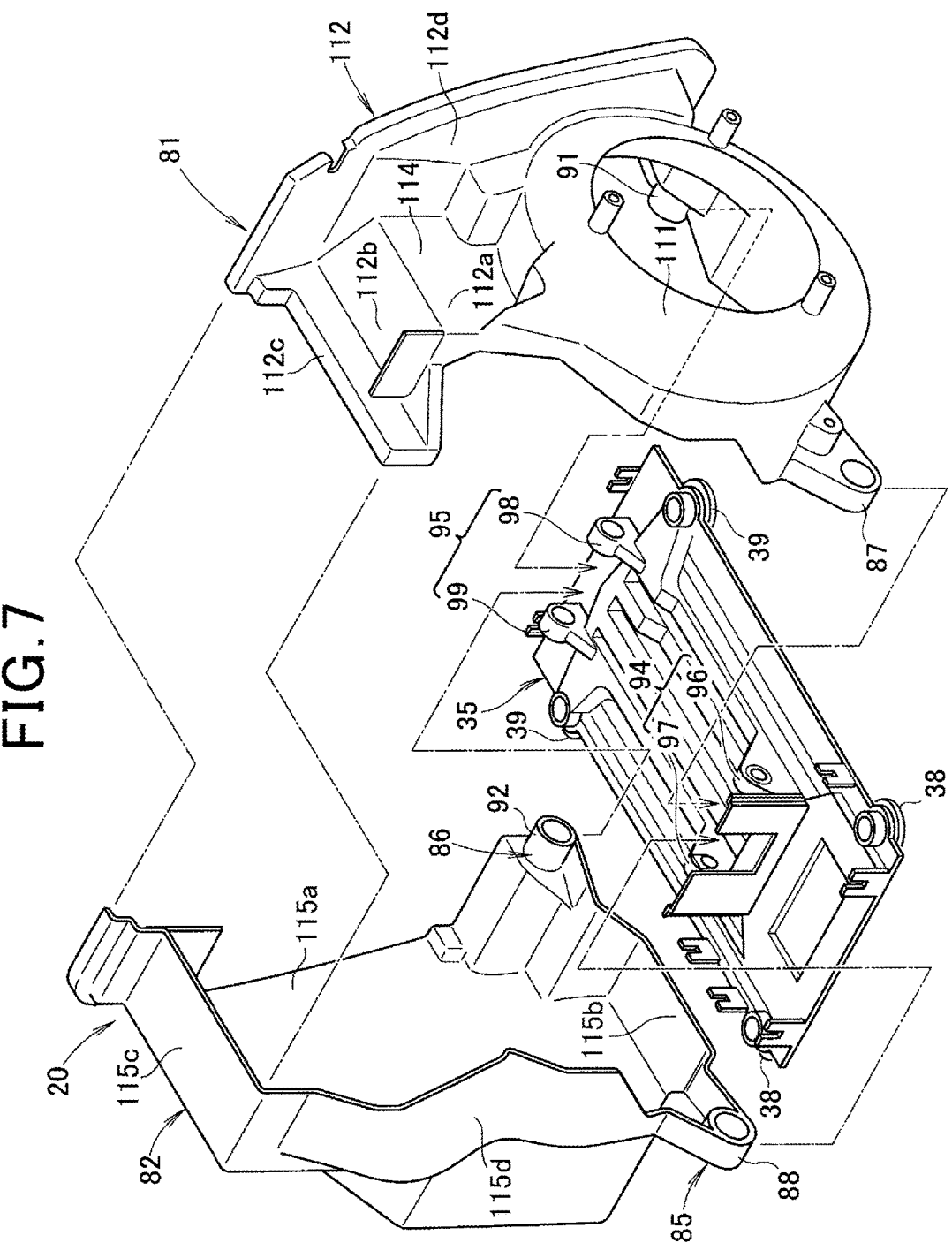
FIG. 7 is an exploded perspective view illustrating a fan cover, a shroud and an undercover in FIG. 3.
Figure 8:
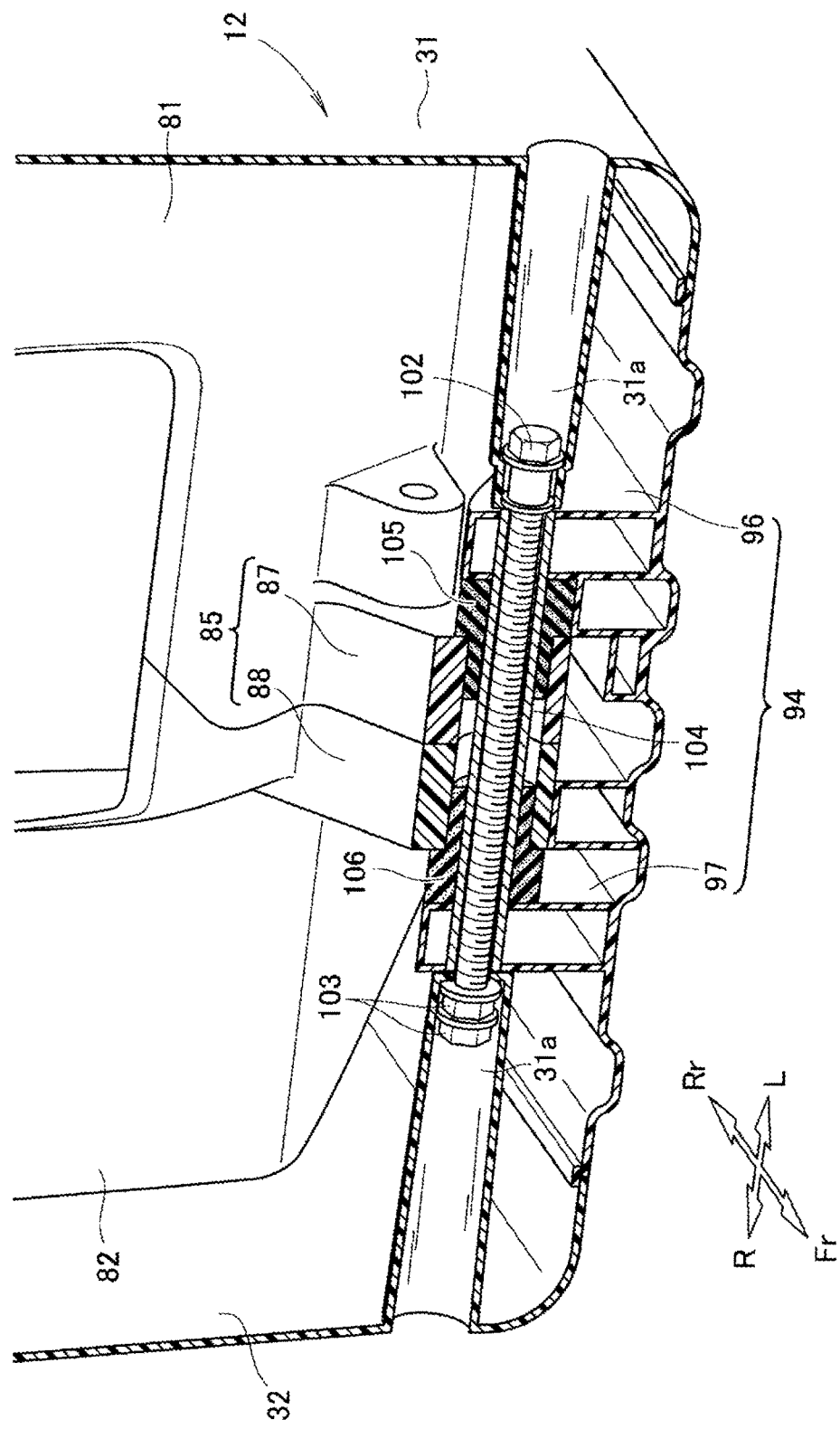
FIG. 8 is a sectional view taken along line 8-8 in FIG. 1.

As illustrated in FIGS. 7 and 8, the first cover mounting portion 87 and the first shroud mounting portion 88 are interposed between the first left support portion 96 and the first right support portion 97. In this state, the respective mounting portions 87 and 88 are connected to the respective support portions 96 and 97 with a bolt 102 and a nut 103.

Further, a spacer 104 is fitted onto the bolt 102. Furthermore, a left shock absorbing portion 105 is interposed between the first cover mounting portion 87 and the spacer 104. A right shock absorbing portion 106 is interposed between the first shroud mounting portion 88 and the spacer 104.

Thereby, the first mounting means 85 is mounted to the first support portion 94. In this state, a front mounting portion 31a of the left case 31 and a front mounting portion 32a of the right case 32 are fastened together to the first support portion 94 with the bolt 102 and the nut 103.

Similarly, the second mounting means 86 is mounted to the second support portion 95. In this state, a rear mounting portion 31b (refer to FIG. 1) of the left case 31 and a rear mounting portion (not illustrated) of the right case 32 are fastened together to the first support portion 94 with a bolt and a nut.

Thereby, the left case 31 is mounted to a left side of the undercover 35, and the right case 32 is mounted to a right side of the undercover 35.

In this state, the fan cover 81 and the shroud 82 are integrally assembled. Further, the left case 31 and the right case 32 of the outer case 12 are integrally assembled.

As above, the first support portion 94 and the second support portion 95 are formed on the undercover 35. Further, the first mounting means 85 and the second mounting means 86 are formed at the fan cover 81 and the shroud 82. Furthermore, the first mounting means 85 is mounted to the first support portion 94, and the second mounting means is mounted to the second support portion.

Thereby, the fan cover 81 and the shroud 82 are mounted to the undercover 35, and therefore, it is not necessary to prepare mounting members separately. Thereby, the number of components of the generator 10 can be further reduced.

Next, the fan cover 81 and the shroud 82 will be described.

As illustrated in FIG. 4, the crankshaft 41 is disposed by being caused to intersect the longitudinal direction of the outer case 12. Further, the cooling fan 17 is provided on the extension line 73 of the crankshaft 41. Here, in the longitudinal direction of the outer case 12, the muffler 67 is provided at a rear side of the engine 15.

Thereby, the muffler 67 is disposed in a position that is deviated from an axis line (that is, the extension line 73 of the crankshaft 41) of the cooling fan 17.

Thereby, it becomes possible to provide the fan cover 81 at the cooling fan 17 side, and provide the shroud 82 at an opposite side of the fan cover 81. Accordingly, the engine 15, the power generating unit 16 and the cooling fan 17 can be covered with the two members that are the fan cover 81 and shroud 82, and therefore, the number of components can be decreased.

Thereby, the number of assembly steps of the fan cover 81 and the shroud 82 can be decreased, and cost reduction can be achieved.

In an ordinary power generator, a fan cover and a shroud are formed separately. Further, the shroud is divided into a left shroud and a right shroud. Consequently, the number of components increases, and this becomes hindrance to decrease of the number of assembly steps of the fan cover and the shroud.

As illustrated in FIG. 7, the fan cover 81 has a cylindrical cover portion 111 that covers the cooling fan 17 and the power generating unit 16 (refer to FIG. 3), a left shroud portion 112 that is integrally formed from a top portion of the cover portion 111 to a lower rear portion, the first cover mounting portion 87 that is formed at a lower front portion of the cover portion 111, and the second cover mounting portion 91 that is formed at a lower rear portion of the cover portion 111.

The left shroud portion 112 has a first left wall 112a that is raised upward from the top portion of the cover portion 111, a left top portion 112b that is projected to above the cylinder head 43 (refer to FIG. 3) from an upper side of the first left wall 112a, a second left wall 112c that is raised upward from an inner side of the left top portion 112b, and a left rear shroud portion 112d that is integrally formed at respective rear sides of the first left wall 112a, the left top portion 112b and the second left wall 112c.

The left shroud portion 112 is disposed at the left side of the engine 15 (refer to FIG. 4). Here, a concave portion 114 is formed by the left shroud portion 112 and the cover portion 111. The air cleaner 62 (refer to FIG. 2) is disposed in the concave portion 114.

The shroud 82 has a right side wall 115a that is disposed at a right side of the engine 15 (refer to FIG. 3), a right bottom portion 115b that is projected along the undercover 35 from a lower side of the right side wall 115a, a right top portion 115c that is projected to the engine 15 side from an upper side of the right side wall 115a, a front wall 115d that is projected to the engine 15 side from the right side wall 115a, the first shroud mounting portion 88 that is formed at a front portion of the right bottom portion 115b, and the second shroud mounting portion 92 that is formed at a rear portion of the right bottom portion 115b.

The engine 15 is covered with the shroud 82 from the right side.

As illustrated in FIGS. 4 and 5, the fan cover 81 and the shroud 82 are integrally assembled. In this state, a rear opening 116 is formed at rear end portions of the fan cover 81 and the shroud 82. The muffler cover 83 is mounted to the rear opening 116.

Further, a space is formed in the inside 21 (that is, the inside of the cover unit 20) of the fan cover 81, the shroud 82 and the muffler cover 83. The engine 15, the power generating unit 16, the cooling fan 17 and the muffler 67 are housed in the space of the inside 21.

In this state, the crankshaft 41 is disposed by being caused to intersect the longitudinal direction of the outer case 12. That is, the engine 15 is disposed to be laterally oriented with respect to the outer case 12. The outer case 12 is formed to be substantially rectangular in plan view that extends in the longitudinal direction.

Consequently, the space L1 between the front rubber support portion 38 and the rear rubber support portion 39 is secured to be large.

Here, the generator 10 (that is, the engine 15) drives, whereby vibration occurs around the crankshaft 41. Consequently, the engine 15 is disposed to be laterally oriented with respect to the outer case 12, and thereby the vibration around the crankshaft 41 can be caused to act in the longitudinal direction of the outer case 12.

Thereby, the vibration of the engine-driven working machine 10 can be favorably suppressed by the front rubber support portion 38 and the rear rubber support portion 39.

Accordingly, the vibration of the generator 10 during an operation can be suppressed to be small, and merchantability of the generator 10 is enhanced.

The muffler 67 is caused to communicate with the exhaust port 45 via the exhaust passage 66, and is disposed at the rear side of the exhaust port 45 and the engine 15. In this state, the muffler 67 is disposed in the rear opening 116.

The muffler 67 and the tail pipe 68 are covered with the muffler cover 83. The muffler cover 83 includes a protector 117 that is mounted to the rear opening 116, and a sound absorbing material 118 that is mounted to an inner surface 117a of the protector 117.

Figure 9:
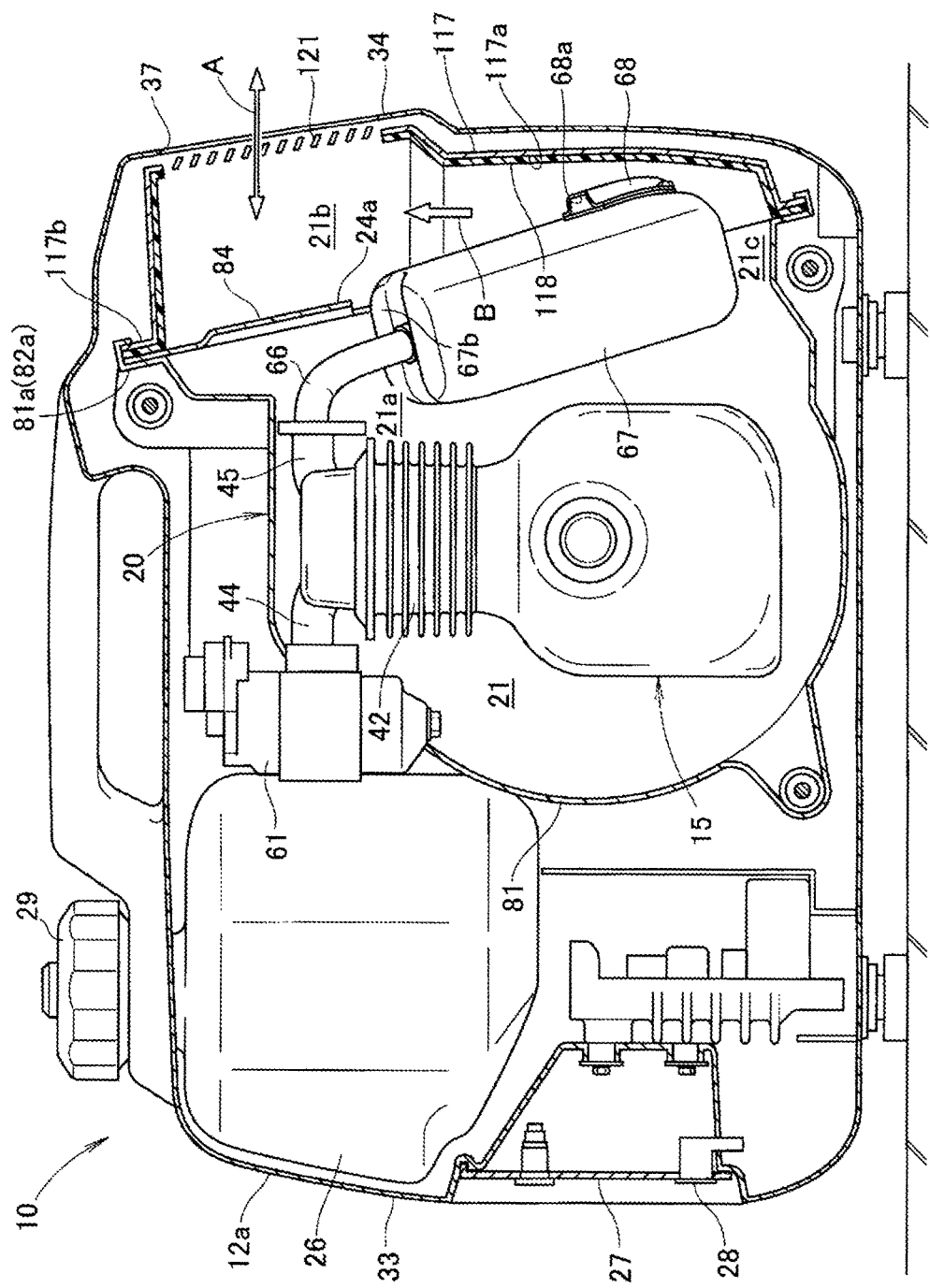
FIG. 9 is a sectional view taken along line 9-9 in FIG. 1.

As illustrated in FIG. 9, the protector 117 is formed to cover the muffler 67 and the tail pipe 68 from behind. The protector 117 has a louver 121 in a substantially rectangular shape in outer shape that is formed at an upper portion. The louver 121 is located inside the discharge port 37 of the rear case 34, and is disposed to face the discharge port 37.

Figure 10:
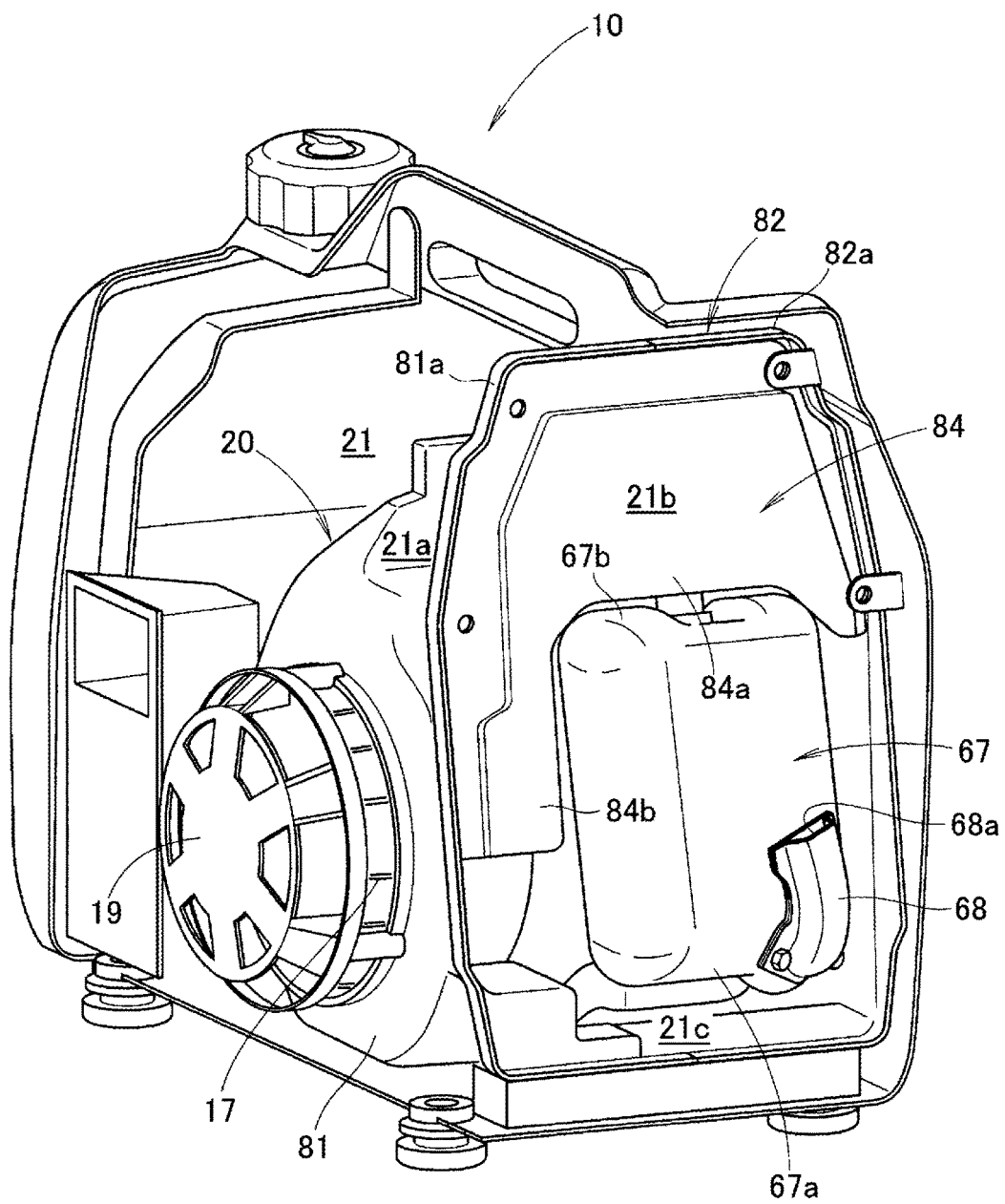
FIG. 10 is a perspective view of a state where a rear case and a muffler cover are removed from the engine-driven working machine in FIG. 9, seen from a rear.

Furthermore, in the protector 117, an opening peripheral edge portion 117b is integrally mounted to the rear end portion 81a of the fan cover 81 and the rear end portion 82a of the shroud 82 (also, refer to FIG. 10).

Further, the discharge port 37 is disposed above the exhaust port 68a of the tail pipe 68. That is, the discharge port 37 and the louver 121 are disposed above the exhaust port 68a of the tail pipe 68. Thereby, the exhaust port 68a of the tail pipe 68 is separated downward from the discharge port 37.

Thereby, exhaust gas from the exhaust port 68a can be exhausted to a position that is away from the discharge port 37 and the louver 121.

Here, the exhaust port 68a of the tail pipe 68 is opened to intersect the opening direction (the arrow A direction) of the discharge port 37. Thereby, an orientation of the discharge port 37 can be shifted from the traveling direction of the exhaust sound (an arrow B direction). Thereby, isolation of the exhaust sound can be further enhanced with the protector 117.

Furthermore, the sound absorbing material 118 is mounted to the inner surface 117a of the protector 117. Thereby, sound of the exhaust gas that is exhausted from the exhaust port 68a can be absorbed by the sound absorbing material 118.

As illustrated in FIGS. 9 and 10, the baffle plate 84 is provided in the inside 21 of the cover unit 20. More specifically, the baffle plate 84 is integrally mounted to substantially upper half portions of the rear end portion 81a of the fan cover 81 and the rear end portion 82a of the shroud 82 in a state where the baffle plate 84 is laid on the opening peripheral edge portion 117b of the protector 117.

In this state, the baffle plate 84 is disposed to face the louver 121 and the discharge port 37. A lower end 84a of the baffle plate 84 is disposed in a vicinity of a top of a top end 67b of the muffler 67, and extends in a lateral direction along the top end 67b.

Further, a lower left portion 84b of the baffle plate 84 is disposed between the muffler 67 and the rear end portion 81a of the fan cover 81. Further, the baffle plate 84 is inclined with a falling gradient toward the rear.

Further, similarly to the baffle plate 84, the muffler 67 is inclined with a falling gradient toward the rear from a vicinity of the lower end 84a of the baffle plate 84.

The baffle plate 84 is provided at substantially upper half portions of the rear end portion 81a of the fan cover 81 and the rear end portion 82a of the shroud 82. Thereby, an upper half part of the inside 21 of the cover unit 20 is partitioned into a space 21a at the engine 15 side and a space 21b at the louver 121 side with the baffle plate 84.

Thereby, the cooling air that is sent from the cooling fan 17 can be guided to below the muffler 67 with the baffle plate 84.

Meanwhile, in a lower half part of the inside 21 of the cover unit 20, the space 21a at the engine 15 side and the space 21b at the louver 121 side communicate with each other. In particular, the space 21a at the engine 15 side and the space 21b at the louver 121 side communicate with each other via a lower space 21c under a lower portion 67a of the muffler 67.

Consequently, the cooling air that is guided to below the muffler 67 can be guided to the space 21b via the lower space 21c.

Next, an example in which intake air flows to the combustion chamber from the intake system 22 of the engine-driven working machine 10, and exhaust gas flows to the exhaust system 24 from the combustion chamber will be described based on FIG. 11.

Figure 11:
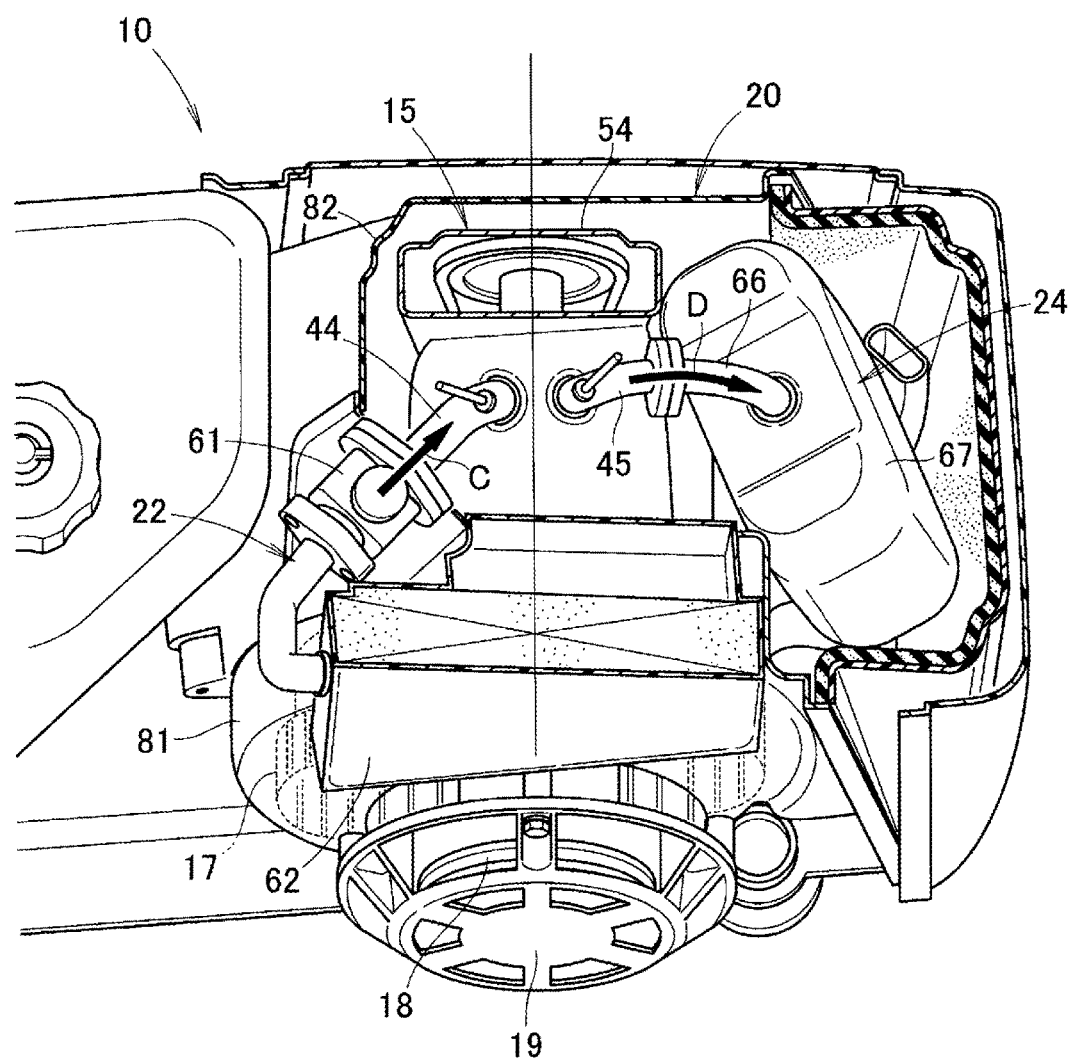
FIG. 11 is a view explaining an example in which intake air flows to a combustion chamber from an intake system of the engine-driven working machine according to the present invention, and exhaust gas flows to an exhaust system from the combustion chamber.

As illustrated in FIG. 11, the carburetor 61 is disposed at the intake port 44 side, and thereby the carburetor 61 is directly mounted to the intake port 44. Thereby, the flow resistance of intake air C that flows to the combustion chamber via the intake port 44 from the carburetor 61 can be suppressed to be small.

Further, the muffler 67 is disposed at the exhaust port 45 side. Thereby, the muffler 67 is allowed to communicate with the exhaust port 45 without curving the exhaust passage 66 significantly. Thereby, the flow resistance of exhaust gas D that flows to the muffler 67 through the exhaust port 45 and the exhaust passage 66 from the combustion chamber can be suppressed to be small.

In this way, the flow resistance of the intake air C is suppressed to be small, and the flow resistance of the exhaust gas D is suppressed to be small, whereby the output power of the engine 15 can be secured.

Next, an example of cooling the power generating unit 16, the cylinder 42 and the muffler 67 with the cooling air that is sent from the cooling fan 17 of the engine-driven working machine 10 will be described based on FIG. 12.

Figure 12:
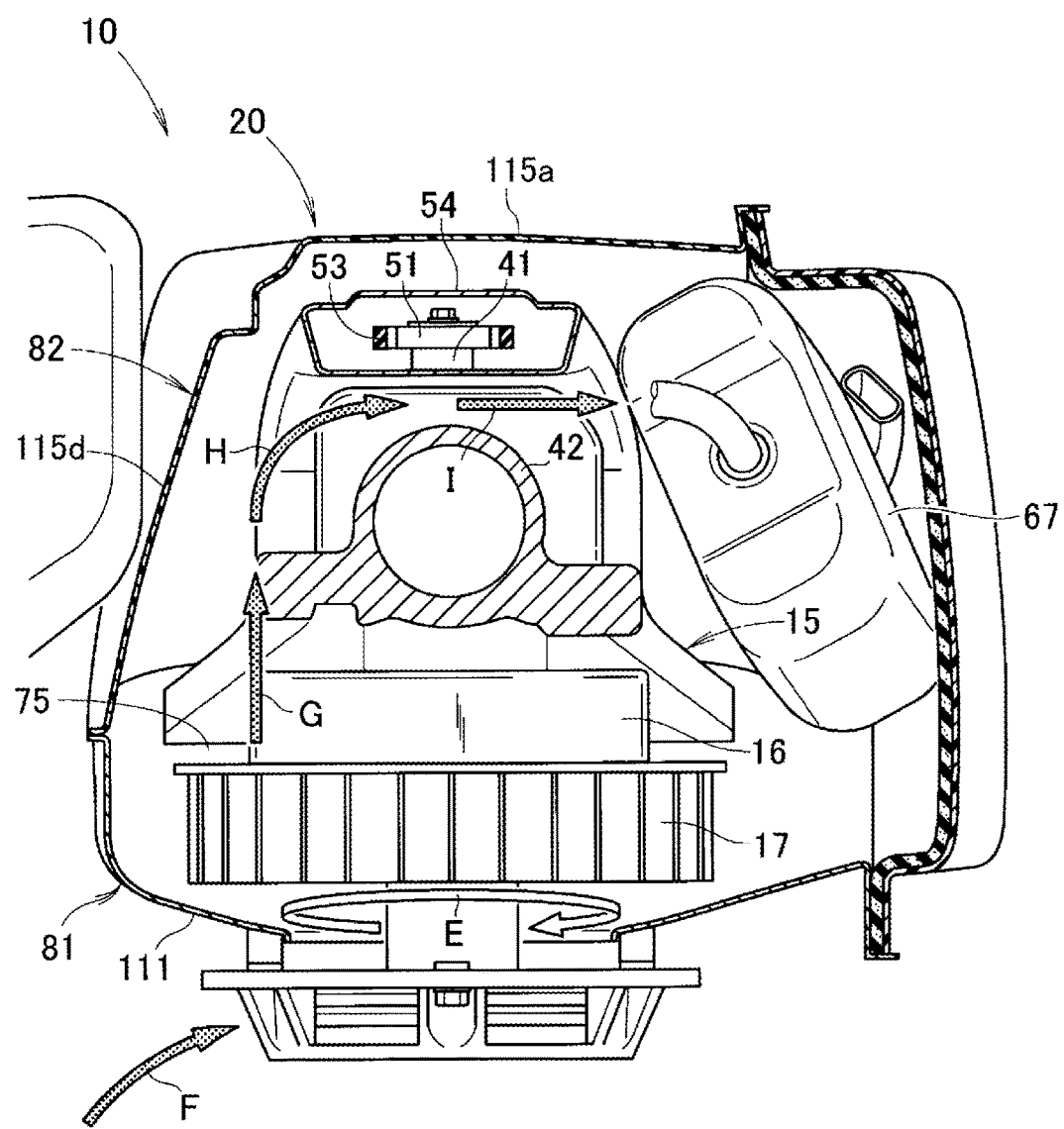
FIG. 12 is a view explaining an example of cooling a power generating unit, a cylinder and a muffler with cooling air that is sent from a cooling fan of the engine-driven working machine according to the present invention.

As illustrated in FIG. 12, the cooling fan 17 rotates like an arrow E, and thereby, outside air is sucked by the cooling fan 17 like an arrow F.

The outside air which is sucked is guided with the fan cover 81, and is sent as cooling air like toward the power generating unit 16 from an outlet port 75 of the cooling fan 17 as an arrow G. The cooling air is sent to the power generating unit 16, and thereby, the power generating unit 16 is cooled with the cooling air.

The cooling air that has cooled the power generating unit 16 is guided with the front wall 115d of the shroud 82 and a cam case 54, and is guided toward the cylinder 42 as an arrow H. The cooling air is guided to the cylinder 42, and thereby the cylinder 42 is cooled by the cooling air. The cooling air that has cooled the cylinder 42 is guided toward the muffler like an arrow I. The cooling air is guided to the muffler, and thereby, the muffler is cooled with the cooling air.

Thereby, the power generating unit 16, the cylinder 42 and the muffler 67 can be efficiently cooled with the cooling air that is sent from the outlet port 75 of the cooling fan 17.

Next, examples of decreasing exhaust sound in the engine-driven working machine 10, and further cooling the protector 117 and the sound absorbing material 118 will be described based on FIG. 13.

First, an example of decreasing the exhaust sound in the engine-driven working machine 10 will be described.

Figure 13:
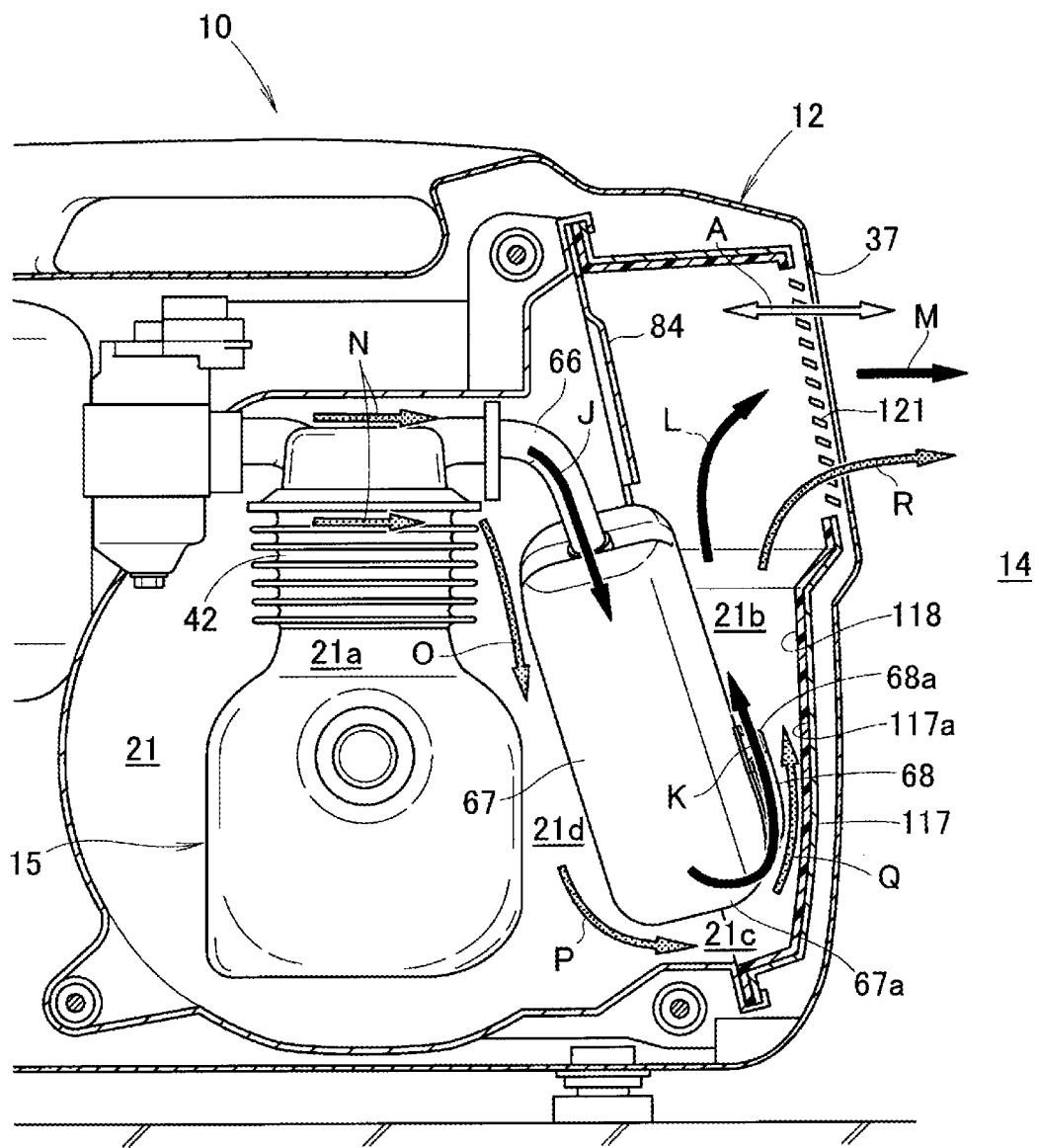
FIG. 13 is a view explaining an example of decreasing exhaust sound and further cooling a protector and a sound absorbing material in the engine-driven working machine according to the present invention.

As illustrated in FIG. 13, the exhaust gas is guided to the muffler 67 from the exhaust passage 66 like an arrow J. The exhaust gas that is guided to the muffler 67 passes through the tail pipe 68 and is exhausted from the exhaust port 68a to the space 21b like an arrow K.

The exhaust gas that is exhausted passes through the space 21b and is guided to the louver 121 like an arrow L. The exhaust gas that is guided to the louver 121 passes through the louver 121 and the discharge port 37 and is discharged to the outside 14 of the outer case 12 like an arrow M.

Here, the louver 121 and the discharge port 37 are disposed above the exhaust port 68a. Consequently, the exhaust port 68a is separated downward from the discharge port 37. Thereby, the exhaust gas from the exhaust port 68a can be exhausted to a position that is away from the discharge port 37 and the louver 121.

Further, the exhaust port 68a is opened to intersect the opening direction (an arrow A direction) of the discharge port 37, and thereby, an orientation of the discharge port 37 can be shifted from a traveling direction of the exhaust sound.

By exhausting the exhaust gas to the position away from the discharge port 37 and the louver 121, and shifting the orientation of the discharge port 37 from the traveling direction of the exhaust sound in this way, insulation of the exhaust sound can be enhanced with the protector 117.

Further, the sound absorbing material 118 is mounted on the inner surface 117a of the protector 117, whereby the sound of the exhaust gas that is exhausted from the exhaust port 68a can be absorbed with the sound absorbing material 118.

By insulating the exhaust sound with the protector 117, and absorbing the exhaust sound with the sound absorbing material 118 in this way, the exhaust sound (that is, noise) can be reduced more favorably. Thereby, the exhaust sound that is transmitted to the outside (that is, the outside 14 of the outer case 12) of the cover unit 20 can be suppressed to be small.

Next, an example of cooling the protector 117 and the sound absorbing material 118 will be described.

As illustrated in FIG. 13, the cooling air that is sent from the cooling fan 17 (refer to FIG. 10) is guided to the baffle plate 84 side via the cylinder 42 like an arrow N. The cooling air that is guided to the baffle plate 84 side is guided toward the muffler 67 side (that is, a lower side) by the baffle plate 84 like an arrow O.

In particular, the baffle plate 84 is inclined with a falling gradient toward the rear. Therefore, the cooling air that is guided to the baffle plate 84 side is efficiently guided toward the muffler 67 side with the baffle plate 84.

The cooling air that is guided to the muffler side is guided to the lower portion 67a of the muffler 67 via a space 21d between the muffler 67 and the engine 15 like an arrow P. The cooling air that is guided to the lower portion 67a of the muffler 67 is guided to the space 21b via the lower space 21c like an arrow Q.

By guiding the cooling air to the space 21b, the cooling air can be guided to the tail pipe 68, the protector 117 and the sound absorbing material 118. Thereby, the protector 117 and the sound absorbing material 118 can be prevented from being deteriorated by exhaust heat.

The cooling air that is guided to the space 21b is discharged to the outside 14 of the outer case 12 via the louver 121 and the exhaust port 68a like an arrow R.

The engine-driven working machine according to the present invention is not limited to the aforementioned embodiment, and modifications, alterations and the like can be made properly.

For example, in the aforementioned embodiment, the example in which the carburetor 61 is directly provided at the intake port 44 is described, but the present invention is not limited to this, and it is also possible to cause the carburetor 61 to communicate with the intake port 44 via the intake passage (the intake manifold).

In this case, the carburetor 61 is also disposed at the intake port 44 side, and therefore, the intake passage that causes the carburetor 61 to communicate with the intake port 44 does not have to be curved significantly, and can be simplified. Thereby, the flow resistance of the intake air that flows in the intake passage is suppressed to be small, and the output power of the engine can be secured.

Further, in the aforementioned embodiment, the example in which the crankshaft 41 is disposed orthogonally to the longitudinal direction of the outer case 12 is described, but the present invention is not limited to this. For example, it is also possible to cause the crankshaft 41 to intersect the longitudinal direction of the outer case 12 in an inclined manner.

Furthermore, the shapes and the configurations of the generator, the outer case, the engine, the cooling fan, the discharge port, the muffler, the tail pipe, the exhaust port of the tail pipe, the baffle plate, the protector, the sound absorbing member and the like which are shown in the aforementioned embodiment are not limited to the shapes and the configurations that are illustrated, but can be properly changed.

The present invention is suitable for application to the engine-driven working machine that has the engine and the muffler housed in the inside of the outer case, and exhausts exhaust gas from the tail pipe of the muffler.

REFERENCE SIGNS LIST

10 Generator (engine-driven working machine)
12 Outer case
13 Inside of outer case
15 Engine
17 Cooling fan
37 Discharge port
67 Muffler
67*a* Lower portion of muffler
68 Tail pipe
68*a* Exhaust port of tail pipe
84 Baffle plate
117 Protector
117*a* Inner surface of protector
118 Sound absorbing member

What is claimed is:

1. An engine-driven working machine in which an engine and a muffler are housed in an inside of an outer case, comprising:
    a tail pipe that is provided at a lower portion of the muffler and communicates with the muffler;
    a discharge port that is disposed above an exhaust port of the tail pipe, and is formed in the outer case;
    a protector that covers the muffler and the tail pipe and has an opening disposed to face the discharge port; and
    a baffle plate that is disposed to face the discharge port, extends downward, and a lower end of the baffle plate is located in a vicinity of an upper end of the muffler so as to guide cooling air, which is sent from a cooling fan to below the muffler, and
    the exhaust port of the tail pipe is arranged to be opened upward at a lower part of a space partitioned by the protector and the baffle plate.

2. The engine-driven working machine according to claim 1, further comprising:
    a sound absorbing member that is provided on an inner surface of the protector.

3. The engine-driven working machine according to claim 1,
    wherein in the tail pipe,
    an exhaust port of the tail pipe is opened to intersect an opening direction of the discharge port.

4. The engine-driven working machine according to claim 2,
    wherein in the tail pipe,
    an exhaust port of the tail pipe is opened to intersect an opening direction of the discharge port.

* * * * *